United States Patent [19]

Murai et al.

[11] Patent Number: 4,866,888
[45] Date of Patent: Sep. 19, 1989

[54] WIRE INCRUSTED WITH ABRASIVE GRAIN

[75] Inventors: Teruyuki Murai; Yoshihiro Hashimoto, both of Hyogo; Takao Kawakita, Osaka, all of Japan

[73] Assignee: Sumitomo Electric Industries, Ltd., Osaka, Japan

[21] Appl. No.: 39,253

[22] Filed: Apr. 17, 1987

[30] Foreign Application Priority Data

Apr. 17, 1986 [JP] Japan ................... 61-89105
Apr. 17, 1986 [JP] Japan ................... 61-89106
Jun. 17, 1986 [JP] Japan ................... 61-141844
Jun. 17, 1986 [JP] Japan ................... 61-141845
Jun. 26, 1986 [JP] Japan ................... 61-150108

[51] Int. Cl.⁴ ............................................. B24D 11/00
[52] U.S. Cl. ....................................... 51/401; 51/394; 83/651.1

[58] Field of Search ................... 29/423; 51/293, 295, 51/309, 401, 394; 83/651.1; 125/12; 299/35

[56] References Cited

FOREIGN PATENT DOCUMENTS 52-44483 7/1977 Japan ................... 83/651.1

Primary Examiner—Timothy V. Eley
Attorney, Agent, or Firm—Cushman, Darby & Cushman

[57] ABSTRACT

A wire incrusted with abrasive grains characterized in that it is produced by preparing a cylindrical metallic body having a metallic rod inserted into the central part of a metallic pipe with a gap formed between the rod and the pipe, then filling the gap with mixed powder comprising metallic powder and abrasive grains having a Mohs hardness of 6 or more, and after that, applying hot working and cold working to the cylindrical metallic body before removing the above-mentioned outermost metallic pipe.

10 Claims, 3 Drawing Sheets

WIRE INCRUSTED WITH ABRASIVE GRAIN

BACKGROUND OF THE INVENTION

The present invention relates to a metallic wire for cutting, grinding or chamfering processing of hard materials and the like and, in particular, to a metallic wire for cutting and grinding processing having abrasive grain powder arranged and retained uniformly and firmly in the surface layer and to a method for producing the metallic wire.

In recent years, the use of a metallic wire for the cutting of hard materials such as ceramics and the like or semiconductor materials such as silicon, gallium arsenic, and the like and further for chamfering processing of fine through holes in workpieces has been studied and carried out.

As a wire used for the above-mentioned uses, a wire with high tensile strength, that is, a so-called saw wire is used. In this case, processing such as cutting or the like is carried out under the condition in which free abrasive grains are existing between the wire and a material to be processed and grinding actions are performed only by frictional force, so that a problem bad efficiency is presented.

Further, for the cutting, there is a so-called electrospark machining method in which a high voltage is applied between the wire and a material to be cut to cut the material by discharge between the both. The method, however, has a problem that the material to be cut is limited only to electroconductive materials.

Recently, a diamond wire produced by coating the surface of a wire with diamond powder by a plating process has been developed and an efficient processing method using the wire and utilizing the grinding force of the diamond powder on the surface of the wire has begun to be studied. However, the diamond powder is only stuck to the wire surface mainly by a Cu or Ni plating layer, so that it has weak adhesion to the surface and also the uniform arrangement and retention of it over the whole surface of the wire are difficult. Therefore, such a method may be reminded that diamond powder is mixed in usual bond metal powder such as Ni, Cu, or the like and then the mixed material is sintered and fixed to the whole surface of wire to produce a diamond wire by applying a usual manufacturing technology for a diamond grindstone.

However, even if the above-mentioned method of sintering and fixing the diamond powder mixed with the bond metal powder to the whole surface of the wire is an ideal method certainly, it is impossible by any means to produce such a long and thin wire by a usual sintering method at present.

On the other hand, double-structure wires such as wires coated with copper or aluminum are now in general use. If such an abrasive grain/steel structure wire as aimed by the invention is taken as a mere double-structure steel wire and a conventional manufacturing technology for the double-structure wires is applied to produce the abrasive grain/steel structure wire, a die for wire drawing is markedly attacked and abraded by the abrasive grains, for example, in a wire drawing process, so that it is impossible practically to apply the conventional wire drawing processing technology to the production of the above-mentioned abrasive grain/steel structure wire.

SUMMARY OF THE INVENTION

In view of the above, an object of the invention is to provide an wire incrusted with effective abrasive grain powder more uniformly and firmly and having an improved cutting and grinding processing function.

Another object of the invention is to provide a method for producing an abrasive grain incrusted wire having the surface layer made of more uniformly and firmly arranged effective abrasive grain powder to improve cutting and grinding processing function.

The wire incrusted with abrasive grains according to the present invention is obtained by the following steps. First, a metallic rod made of a metallic material of the same kind with or different kind from a metallic pipe 1 made of a desired metallic material is inserted into the central part of the metallic pipe 1 with a gap S formed between the both to obtain a constructed metallic body A having desired dimensions, then the gap S is filled with a mixture D containing metallic powder 4 and abrasive grains 3 having Mohs hardness of 6 or more as the main component, and after that, end parts of the metallic body A are sealed hermetically.

Subsequently, hot working such as extrusion or rolling, or a heat treatment such as annealing or patenting is applied to the above-mentioned metallic body A having its ends hermetically sealed and after that, the metallic body A is subjected to a cold working to produce a wire of desired diameter.

After that, the residual metallic pipe 1 positioned at the outermost layer of the above-mentioned wire is removed by polishing, pickling, and the like and thus an abrasive grain incrusted wire having a mixed layer D' exposed on the surface of the central metallic rod 2 is obtained, the mixed layer D' having the above-mentioned abrasive grain 3 retained uniformly and firmly in the metallic layer 4' consisting of sintered metallic powder.

The first aspect and the second aspect of the invention are the thus obtained wire itself incrusted with abrasive grains and a method for producing the wire, respectively. It is a remarkable characteristic of the invention that abrasive grains mixed with the metallic powder are not limited to diamond powder and CBN (cubic boron nitride) powder but ceramics, superhard alloys, glass, and the like having Mohs hardness of 6 or more can be used as the abrasive grain, and, in particular, ceramics such as alumina ($Al_2O_3$), silicon nitride ($Si_3N_4$), and the like are also usable.

The Mohs hardness herein is an empirical scale to determine the hardness of ores by comparison with ten kinds of ores providing standards. The standard ores in an order of the softest ore (having a scale of 1) to the hardest one (having a scale of 10) are talc, gypsum, calcite, fluorite, apatite, orthoclase, qualtz topaz, corundum, and diamond. Abrasive grains used in the invention have usually hardness larger than that of orthoclase standard having hardness of 6. Abrasive grains having hardness lower than that of orthoclase standard are not appropriate in respect of the performance of obtained wire incrusted with abrasive grains.

Further, the above-mentioned abrasive grains are usually mixed with metallic powder and the mixture in a powdered state is filled into a gap in the above-mentioned metallic body but it is effective to granulate the above-mentioned mixture and to fill the resulting granules into the gap for the purpose of preventing the metallic powder and the abrasive grains from separation or segregation caused by a difference in gravity between the both.

A pipe-shaped metal B may be fitted tightly around the metallic rod 2 inserted into the central part of the metallic pipe 1 with a gap formed between the metal B and the pipe 1 or a thin metallic belt C may be wound around the above-mentioned rod to remove possibility that, in a cold wire drawing process, the above-mentioned inserted metallic rod 2 is pierced with abrasive grains and notched in its central part.

In the above-mentioned case, for the pipe-shaped metal or for the wound thin metallic belt, not only the same metallic component as that of the metallic pipe and metallic rod but also a metallic component different from that of the above-mentioned pipe and rod can be used.

According to the thus obtained wire incrusted with abrasive grains and to a method for manufacturing the wire, it is easy to form the metallic pipe and the central metallic rod separately into an appropriate size by using the components of the same kind or of different kind that fit the use conditions for the both.

As a mixture composed of metallic powder having various components and abrasive grain powder having a Mohs hardness of 6 or more mixed at a suitable ratio for various use conditions as a main component is filled into a gap between the metallic pipe and the metallic rod to form a metallic body and after that, the both ends of the metallic body are hermetically sealed, it becomes possible to apply hot working and subsequent cold working to the metallic body while maintaining the mixing ratio and the homogeneity of the mixture when the mixture is prepared. Further, as the outermost layer of the above-mentioned metallic body is a metallic pipe and a wire draw-working is brought into contact with only the metallic pipe during a wire drawing process, the wire drawing die is not brought into contact with the abrasive grain powder, so that the abrasive grain powder is firmly stuck to the wire.

As the thus obtained wire of desired diameter has the outermost layer consisting of only the metallic pipe, if the metallic pipe layer is removed, the mixed layer containing abrasive grains is exposed on the outermost surface of the resulting wire. Accordingly, the wire incrusted with abrasive grains can be produced readily and cheaply.

DETAILED DESCRIPTION OF THE PREFERRED EMBODIMENTS

The present invention will be described in more details with respect to the preferred embodiments.

Figure 1A:
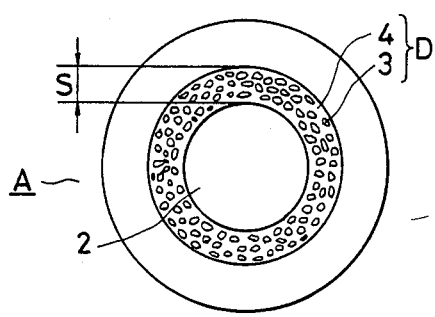
FIG. 1(a) and 1(b) are a plan view and a side sectional view showing the structure of a metallic body used in the present invention, respectively.
Figure 1B:
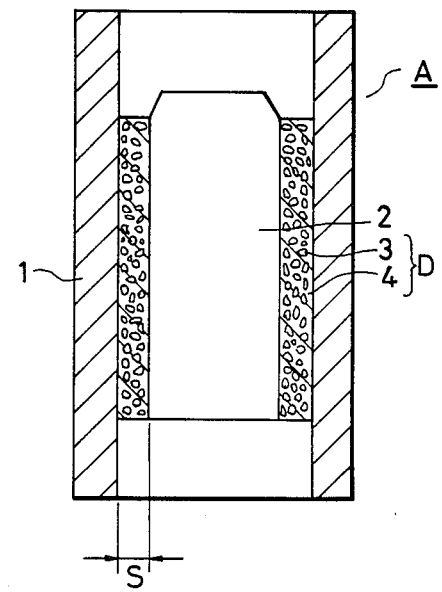

Figs. 1(a) and 1(b) are a plan view and a side sectional view, each showing the structure of a metallic body A having a metallic rod 2 inserted into the central part of a metallic pipe 1 and having a gap between the metallic pipe and the metallic rod filled with a mixture principally comprising metallic powder and abrasive grains.

In Figs. 1(a) and 1(b), A shows the metallic-body, 1, the outermost metallic pipe, and 2, the metallic rod in the central part of metallic pipe. The metallic rod 2 is inserted into the central part of the metallic pipe 1 with a gap S formed between the two, and a mixture of abrasive grains 3 having a Mohs hardness of 6 or more with metallic powder 4 is filled into the gap S.

As the material of the metallic pipe 1 positioned at the periphery of the metallic body A and of the metallic rod 2 in the central part of the metallic body A, carbon steel is used generally but stainless steel, a copper alloy, or the like may be used according to the use conditions, and materials of the metallic pipe 1 and the metallic rod 2 may be different from each other.

The thickness of the metallic pipe 1, the diameter of the metallic rod 2, and the width of the gap between the both are each determined appropriately according to the diameter of a final wire for use, to the average grain size of abrasive grains 3 and to a mixing ratio of the abrasive grain 3 to the metallic powder 4.

Further, as the abrasive grain powder 3 having a Mohs hardness of 6 or more, there are specifically, in addition to diamond powder and CPN powder, ceramins such as alumina ($Al_2O_3$) and silicon nitride ($Si_3N_4$), hard metal powder, glass powder, and the like, and they are used in the form of a single compound or of a mixture of two or more compounds.

As the metallic powder 4 with which the abrasive grain powder 3 is mixed, Ni powder or Ni base alloy powder is generally used but, other than those, Cu powder, Cu base alloy powder, Co powder, Co base alloy powder, and the like which are bond metal powder used for manufacturing of general abrasive grain tools may be used. Both ends of gap S of the metallic body A after being filled with the mixed powder D are capped with an appropriate cover material and then welded to seal the metallic body A hermetically. After that, hot working such as extrusion or rolling and then a heat treatment such as annealing or patenting is applied and subsequently, cold working is applied to the metallic body A to produce a wire having a desired diameter.

If the diffusion of the metallic powder 4 filled in the gap between the metallic pipe 1 and the central metallic rod 2 into the metallic pipe 1 or into the metallic rod 2 during the hot working is undesirable, it is possible to prevent the diffusion phenomenon by plating the inner surface of the metallic pipe 1 or the outer surface of the metallic rod 2 with copper or the like in advance to form a layer to prevent the diffusion.

Figure 4A:
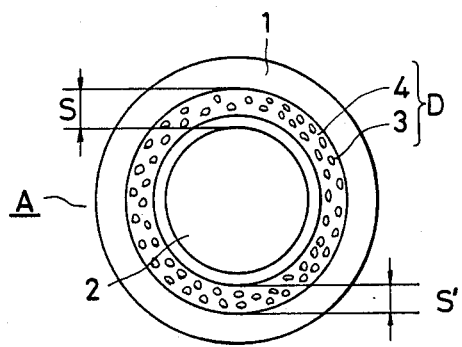
FIGS. 4(a), and 4(b) are a plan view and a side sectional view showing a modified example having a pipe-shaped metal fit tightly around the metallic rod respectively.
Figure 4B:
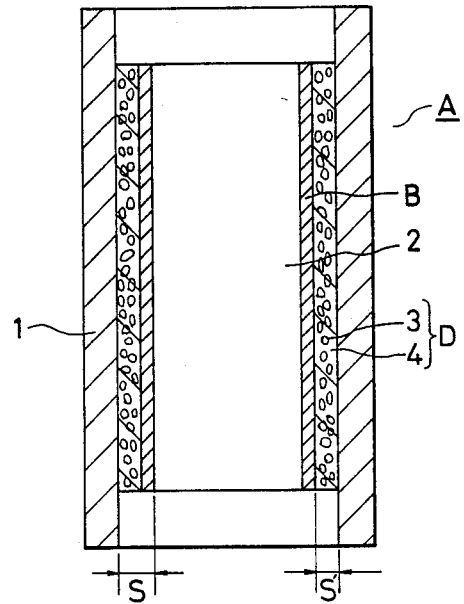
Figure 5A:
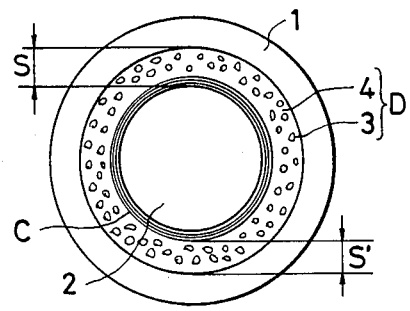
FIGS. 5(a) and 5(b) are a plan view and a side sectional view of another modified example having a thin metallic belt wound around the metallic rod, respectively.
Figure 5B:
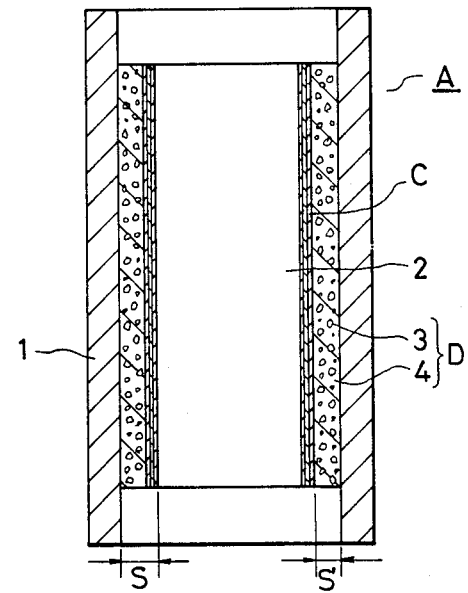

Also, as shown in FIG. 4 and FIG. 5, a pipe-shaped metal B may be fitted tightly around the metallic rod 2 inserted into the central part of metallic pipe 1 with a gap formed between the metal B and the pipe 1 or a thin metallic belt C may be wound around the rod 2. That is effective to remove possibilities that, in a cold working the above-mentioned inserted metallic rod 2 is pierced with abrasive grains and it is notched in its central part.

Further, if, for example, a mixture of diamond abrasive grain powder and Ni powder is filled into the gap, the two types of powder have a tendency to segregate and separate due to a difference in gravity between the both because the specific density of diamond and Ni is 3.5 g/cm$^3$ and 8.9 g/cm$^3$, respectively. A wire produced by use of the above-mentioned mixed powder having non-uniform composition and containing segregation shows a marked difference in the density of exposed abrasive grains at different locations on the wire surface, so that there are possibilities to provide an improper product.

To prevent the above-mentioned defect, the mixed powder comprising diamond abrasive grains and Ni powder is granulated to prepare powder comprising spherical granules, which is filled into the gap between the above-mentioned metallic pipe and central metallic rod.

In the process, there are no possibilities that diamond abrasive grains separate or segregate from Ni powder.

To conduct a granulation-treatment, a binder is added as an additive but if a binder such as an organic compound is used, joining between particles of powder is sometimes hindered by the above-mentioned binder when the above-mentioned metallic body is treated in after processes.

Therefore, it is effective to heat the above-mentioned metallic body after the granulated powder has been filled into the gap and before end parts of the metallic body A are sealed hermetically to decompose and evaporate the binder and remove a cause for the above-mentioned hindrance.

After the cold working, the residual metallic pipe 1a the outermost layer of the wire is removed by polishing, pickling and the like.

Figure 2:
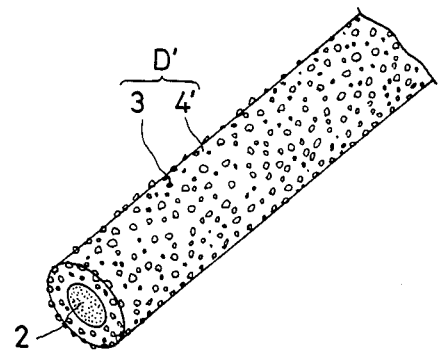
FIG. 2 is a conceptional view showing a wire incrusted with abrasive grains produced by the method of the present invention.

FIG. 2 shows the thus obtained wire incrusted with abrasive grains having a mixed layer D' exposed on the surface of the drawn central metallic rod 2, the mixed layer D' having the abrasive grains retained uniformly and firmly in the metallic layer 4' consisting of sintered metallic powder.

Figure 3A:
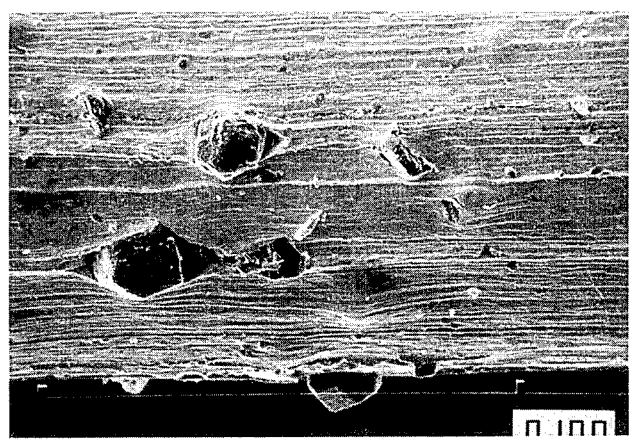
FIG. 3(a) is a microphotograph (of 40 magnifications) showing one example of the surface of the wire of the present invention.

FIG. 3(a) is a micrograph showing one example of the surface metallic structure of the thus obtained wire.

Subsequently, specific examples to produce a wire incrusted with abrasive grains by the method of this invention will be described hereinafter.

EXAMPLE 1

In a metallic body A shown in FIG. 1, as the material, JIS-SS 41 steel material was used for the peripheral metallic pipe 1 and JIS-SK 7 steel material for the central metallic rod 2. As the size of the metallic body D A, the outermost diameter was 70 mm$\phi$, the thickness of the peripheral metallic pipe was 5 mm, and the width of the gap S was 8 mm.

As the abrasive grain, diamond grains were used, and fine diamond powder having an average particle size of 50 $\mu$m was mixed with mixed powder prepared by mixing 0.5% by weight of carbon with pure nickel powder at a mixing ratio of 13% by volume of the diamond powder to prepare a mixture D. After the gap in the metallic body A was filled with the mixture D, both ends of the gap part were and sealed hermetically.

Figure 3B:
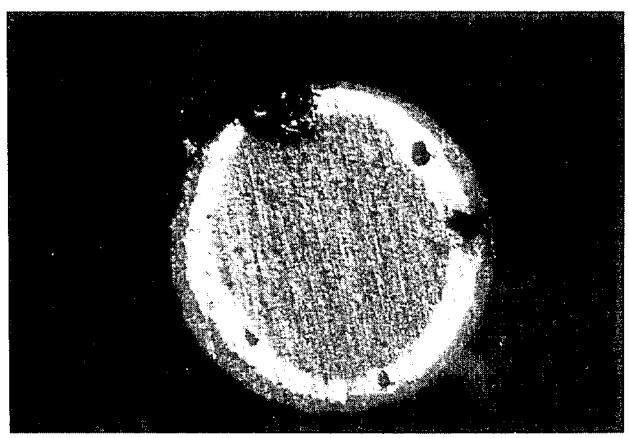
FIG. 3(b) is a microphotograph (of 40 magnifications) showing one example of the section of a wire before being polished and pickling on the course of production by the method of the present invention.

After that, the metallic body A was heated at 1000° C. for 2 hours and then extruded at an extrusion ratio of 15. Further, a heat treatment and cold working were repeated to produce a wire of 1.0 mm$\phi$. The tensile strength of the wire was 182 kg/mm$^2$. FIG. 3(b) is a micrograph showing one example of metallic structure in the section of the wire.

The thus obtained wire was dipped into a hydrochloric acid solution concentration of 35% for 15 minutes to dissolve and remove the carbon steel material (SS 41) of the metallic pipe which remained as the outermost layer of the wire and after that, it was neutralized with an alkali solution and washed with water.

FIG. 3(a) is a micrograph showing one example of metallic structural state of the surface of the thus obtained wire incrusted with diamond abrasive grains, and it is realized that fine diamond grains are stuck to and embedded into the periphery of the wire uniformly and firmly.

EXAMPLE 2

In the metallic body A shown in FIG. 1, as the material, JIS-SS 41 steel material and JIS-SUS 304 stainless steel material were used for the peripheral metallic pipe 1 and for the central metallic rod 2, respectively. As the size of metallic body A, the outermost diameter was 70 mm, the thickness of the peripheral metallic pipe 5 mm and the width of the gap S in the metallic body A 8 mm.

As the abrasive grain, CBN grains were used, and CBN grains having an average particle size of 150 $\mu$m were mixed with pure nickel powder at a mixing ratio of 13% by volume of CBN grains to prepare a mixture D. After the gap part of the metallic body A was filled with the mixture D, both ends of the gap part were sealed hermetically.

After that, the metallic body A was heated at 1050° C. for 2 hours and then extruded at an extrusion ratio of 15. Further, a heat treatment and cold working were repeated to produce a wire of 1.0 mm$\phi$. The tensile strength of the wire was 183 kg/mm$^2$. The wire was dipped into a hydrochloric acid solution of concentration of 35% to dissolve and remove the outermost carbon steel material (SS 41) of the metallic body A which remained as the outermost layer of the wire and after that, it was neutralized with an alkali solution and washed with water.

The thus obtained wire incrusted with abrasive grains was used for cutting and grinding processing of iron based materials and as a result, extremely good cutting and grinding processing could be performed, whereas, with the conventional diamond wires produced by a plating method, the surface diamond grains were abraded intensely owing to the action of the iron of the surface of the worked iron material and processing of the iron material with the wire was difficult.

EXAMPLE 3

As the material of metallic body A shown in FIG. 1, JIS-SS 41 steel material and JIS-SK 7 steel material were used for the outermost metallic pipe 1 and for the central metallic rod 2, respectively. As the size of the metallic body A, the outermost diameter was 70 mm$\phi$, the thickness of the outermost metallic pipe 7 mm, and the width of the gap S in the metallic object A 7 mm. Diamond powder of average particle size of 30 $\mu$m was mixed with a mixture prepared by mixing 0.5% by weight of carbon with pure nickel powder at a mixing ratio of 15% by volume of diamond powder to produce mixed powder D. After the gap S of the metallic object A was filled with the mixed powder D, both ends of the gap S were sealed hermetically.

After that, the metallic object A was heated at 1050° C. for 2 hours and then extruded at an extrusion ratio of 15. Further, a heat treatment and cold working were repeated to produce a wire of 0.26 mmφ. The tensile strength of the wire was 179 kg/mm². The wire was dipped into a hydrochloric acid solution of concentration of 35% for 5 minutes to dissolve and remove the outermost carbon steel material (SS 41) of the metallic object A which remained as the outermost layer of the wire and after that, it was neutralized with an alkali solution and washed with water.

The thus obtained wire incrusted with diamond abrasive grains, as clearly shown from the results in Table 1 and Table 2 described later, had strong adhesion of diamond abrasive grains 3 to the surface of wire, an increased cutting speed and a markedly long life as compared with the conventional diamond wires having the same diameter and diamond powder stuck to the surface by a plating method.

One example of results of the above-mentioned comparative experiments is shown in Table 1 and Table 2.

TABLE 1

Material of work: Pre-sintered body of WC-12% Co alloy
Size of work: 35 mm diameter

| Test items | Wire incrusted with diamond by method of invention | Diamond wire by conventional plating method |
| --- | --- | --- |
| Lineat velocity (m/sec) | 8 | 4 |
| Load (kg) | 1 | 1 |
| Cutting time (sec) | 45 | 440 |
| Cutting speed (mm²/min) | 1296 | 131 |
| Finishing condition | Good | Good |
| Total time of life (hr) | about 210 | about 30 |

TABLE 2

Material of work: Si single crystal
Size of work: 50 mm diameter

| Test items | Wire incrusted with diamond by method of invention | Diamond wire by conventional plating method |
| --- | --- | --- |
| Linear velocity (m/sec) | 150 | 150 |
| Load (kg) | 4 | 4 |
| Cutting time (min) | 12.4 | 53 |
| Cutting speed (mm²/min) | 158.3 | 37.0 |
| Finishing condition | Good | Good |
| Total time of life (hr) | about 40 | about 8.5 |

EXAMPLE 4

As the material of metallic body A shown in FIG. 1, a carbon steel pipe (JIS-STK 30) and a piano wire (JIS-SWRS 72B) were used for the peripheral metallic pipe 1 and for the central metallic rod 2, respectively.

As the size of metallic body A, outermost diameter was 20 mm, the thickness of the metallic pipe 2 mm and the diameter of the metallic rod 13 mm.

As the abrasive grain, fine diamond powder having an average particle size of 30 μm was used. The diamond powder was mixed with Ni powder at a mixing ratio of 15% by volume of diamond powder to prepare a mixture and further, to the mixture, 0.5% by weight of camphor as a binder was added to prepare mixed powder. After that, the mixed powder was granulated by a wet spray method to prepare granules, which were then held in a nitrogen atmosphere at 300° C. for 1 hour to sublime camphor. Thus, a mixture D comprising the granules was produced.

After the mixture D was filled into the gap of the metallic body A, both ends of the metallic body A were sealed hermetically.

After that, the metallic body A was not extruded but a heat treatment and cold working were repeated to produce a wire of 0.26 mmφ. The tensile strength of the wire was 180 kg/mm².

By the same way as in Example 3, the outermost layer 1 of the metallic body A was dissolved and removed, and after that, the resulting wire was neutralized with an aqueous alkali solution and washed with water.

The wire was used for cutting processing and as a result, good cutting performance comparable to that in Example 3 was obtained.

EXAMPLE 5

As the material of metallic body A shown in FIG. 4, a cargon steel material (JIS-SS-41) and a carbon steel material (JIS-SK 7) were used for the peripheral metallic pipe 1 and for the central metallic rod 2, respectively.

As the size of the metallic body A, the outermost diameter was 70 mm, the thickness of the metallic pipe 5 mm, and the width of the gap S 6 mm.

A pure nickel tube B having an inner diameter of 48 mm and a wall thickness of 2 mm was inserted into the gap S to fit it tightly around the metallic rod 2. Diamond powder having an average particle size of 120 m was mixed with a mixture prepared by mixing 0.5% by weight of carbon with pure nickel powder at a mixing ratio of 13% by volume of diamond powder to prepare mixed powder D. After the gap S' between the above-mentioned Ni tube B and the metallic pipe 1 in the metallic body A was filled with the mixed powder D, both ends of the gap S in the metallic object A were sealed hermetically.

After that, the metallic body A was heated at 1050° C. for 2 hours, and then extrude at an extrusion ratio of 15. Further, a heat treatment and cold working were repeated to produce a wire of 1.0 mmφ. The tensile strength of the wire was 168 kg/mm².

The structure of the wire was observed on a microphotograph and as a result, it was found that diamond particles were separated from the central metal rod by the pipe-shaped nickel metal and the central metal rod was not pierced with diamond particles and was not notched.

Next, the wire was dipped into a hydrochloric acid solution of concentration of 35% for 15 minutes to dissolve and remove the outermost metallic pipe of carbon steel (SS 41) of the metallic body A which remained as the outermost layer of the wire. After that, the resulting wire was neutralized with an aqueous alkali solution and washed with water.

The thus obtained wire incrusted with diamond abrasive grains was a wire of long life which had the outer peripheral part stuck uniformly with diamond particles and the inside part not pierced with diamond particles into the center part and not notched.

EXAMPLE 6

As the material of metallic body A shown in FIG. 5, a carbon steel pipe (JIS-STK 30) and a piano wire (JIS-SWR 72B) were used for the peripheral metallic pipe 1 and for the central metallic rod 2, respectively.

As the size of the metallic body A, the outermost diameter was 20 mm, the thickness of the metallic pipe 2 mm, and the diameter of the metallic rod 12 mm.

A thin belt C of pure nickel of 0.1 mm thick was wound densely around the metallic rod 2 to form a nickel belt layer of thickness of 0.5 mm on the rod 2. After a gap S' between the nickel belt and the metallic pipe 1 was filled with mixed powder D prepared by mixing CBN abrasive grains 3 having an average grain size of 30 μm with pure nickel metal powder at a mixing ratio of 13% by volume of CBN abrasive grains 3, both ends of the gap S were capped and after that, were sealed hermetically.

After that, a heat treatment comprising heating to 950° C. and subsequently being allowed to cool by air and cold working were applied to the metallic body A seven times repeatedly to produce a wire of diameter of 0.26 mm. The tensile strength of the wire was 171 kg/mm$^2$. The wire was dipped into a hydrochloric acid solution of concentration of 35% for 5 minutes to dissolve and remove the outermost carbon steel (STK 30) material of the metallic body A which remained as the outermost layer of the wire. After that, the resulting wire was neutralized with an alkali solution and washed with water.

As shown clearly by the results in Table 3, the thus obtained wire incrusted with CBN abrasive grains was a wire of markedly long life which had no possibilities that the central metallic rod was pierced with CBN abrasive grains and was notched easily and the wire fractured easily, as compared with a wire incrusted with CNB abrasive grains of the same diameter produced by the conventional wire drawing method using none of a pipe-shaped metallic body and a thin metallic belt.

TABLE 3

Material of work: Pre-sintered body of WC-12% Co alloy
Size of work: 50 mm diameter

| Test items | Wire incrusted with CBN by method of invention | Wire incrusted with CBN by conventional wire drawing method |
|---|---|---|
| Linear velocity (m/sec) | 8 | 8 |
| Load (kg) | 1 | 1 |
| Cutting time (min) | 1.6 | 1.7 |
| Cutting speed (mm$^2$/min) | 1217 | 1159 |
| Finishing condition | Good | Good |
| Total time of life (hr) | about 215 | about 126 |

EXAMPLE 7

As the material of metallic body A shown in FIG. 1, a JIS-SS 41 steel material and a JIS-SUS 304 stainless steel material were used for the peripheral metallic pipe 1 and for the central metallic rod 2, respectively. As the size of the metallic body A, the outermost diameter was 70 mm, the thickness of the peripheral metallic pipe 5 mm, and the width of gap S 8 mm. After the gap S of the metallic body A was filled with mixed powder D prepared by mixing alumina (A$_2$O$_3$) powder 3 having an average particle size of 150 μm with pure Ni powder at a mixing ratio of 13% by volume of alumina, both ends of the gap S of the metallic body A were sealed hermetically.

After that, the metallic body A was heated at 1050° C. for 2 hours and then extruded at an extrusion ratio of 15. Further, a heat treatment and cold working were repeated to produce a wire of 1.0 mmφ. The tensile strength of the wire was 183 kg/mm$^2$. The wire was dipped into a hydrochloric acid solution of concentration of 35% to dissolve and remove the outermost carbon steel (SS 41) material of the metallic body A which remained as the outermost layer of the wire. After that, the resulting wire was neutralized with an alkali solution and washed with water.

When the thus obtained wire incrusted with abrasive grains was used for cutting and grinding processing of iron-containing materials, it could show very good cutting and grinding performance, whereas diamond powder on the surface of diamond wire produced by the conventional plating method was abraded intensely owing to the iron on the surface of the worked iron material and processing of the material with the diamond wire was difficult.

EXAMPLE 8

As the material of metallic body A shown in FIG. 1, a carbon steel pipe (JIS-STK 30) (and a piano wire (JIS-SWRS 72B) were used for the peripheral metallic pipe 1 and for the central metallic rod 2, respectively.

As the size of the metallic body A, the outermost diameter was 20 mm, the thickness of the metallic pipe 2 mm, and the diameter of the metallic rod 13 mm. After the gap S between the metallic pipe 1 and the metallic rod 2 was filed with mixed powder D prepared by mixing silicon nitride (Si$_3$N$_4$) powder 3 as abrasive particles having an average particle size of 30 μm with copper powder at a mixing ratio of 15% by volume of silicon nitride powder, both ends of the gap S of the metallic body A were sealed hermetically.

After that, a heat treatment comprising heating to 900° C. and subsequently being allowed to cool in air and cold working were applied to the metallic body A seven time repeatedly to produce a wire of diameter of 0.26 mm. The tensile strength of the wire was 154 kg/mm$^2$. The wire was dipped into a hydrochloric solution of concentration of 35% for 5 minutes to dissolve and remove the outermost carbon steel (STK 30) material of the metallic body A which remained as the outermost layer of the wire. After that, the resulting wire was neutralized with an alkali solution and washed with water.

The thus obtained wire incrusted with abrasive grains was used for cutting of Si single crystal and as a result, very good cutting processing could be performed.

As described above, according to the invention, a metallic body formed easily into suitable dimensions and by suitable materials for use conditions is used, and after the gap within the metallic body is filled with mixed powder prepared by mixing metallic powder of desired components and mixed ratio with abrasive grains having Mohs hardness of 6 or more at a desired mixing ratio, both ends of the gap are welded and sealed hermetically. As the outermost part of the metallic body is only a metal of metallic pipe, even if the conventional double structure wire producing technology is applied to the metallic body without any change, there are no possibilities that the abrasive grains directly attack a die for wire drawing, so that the metallic body can be subjected to wire drawing processing easily up to a desired wire diameter as in the production process for the conventional double structure steel wire.

Further, also in the final process to expose a mixed layer containing abrasive grain powder having Mohs hardness of 6 or more as the outermost layer of wire, a metal remained on the surface of the wire can be removed readily by applying a usual polishing, pickling or the like.

As a heat treatment in an extensive meaning including direct hot working and cold working are applied to the metallic body having the mixed powder filled into the gap hermetically, the above-mentioned abrasive grain powder in the mixed layer formed of sintered metallic powder in the mixed powder can be arranged and retained uniformly and firmly maintaining its mixing ratio at the time of filling unchanged. Thus, a wire incrusted with abrasive grains suitable for cutting and grinding processing can be produced readily, which can have an increased cutting speed and a markedly extended wire life and has very excellent cutting or chamfering processing performance as compared with the conventional diamond wire having diamond power only stuck to its surface by a plating method.

Further, the wire of the present invention has also markedly large retaining power for abrasive grains when the wire is bended as compared with the wire produced by the plating method.

As the wire incrusted with abrasive grains produced by the method of the invention has abrasive grains firmly embedded into the surface of wire, it, as a wire for precise cutting, is most suitable for cutting of a brittle material or of a material hard to be applied by a cutting method using a liquid such as water or an oil.

What is claimed is:

1. A wire incrusted with abrasive grains produced by the following process:
    preparing a cylindrical metallic body having a metallic rod comprising a metallic material inserted into the central part of a metallic pipe with a gap formed between said rod and said pipe.
    filling said gap with mixed powder comprising metallic powder and abrasive grains having Mohs hardness of 6 or more;
    shaping said body into a wire of desired diameter while first heating by extrusion or by rolling said body and, then while cooling said body; and
    finally removing said outermost metallic pipe.

2. A wire incrusted with abrasive grains as claimed in claim 1, wherein abrasive grains include one material or two or more ones selected from a group consisting of diamond, CBN (cubic boron nitride), ceramics, hard metal, and glass.

3. A wire incrusted with abrasive grains as claimed in claim 1, wherein said metallic rod is tightly covered with a second metallic pipe or a thin metallic belt wound therearound.

4. A wire incrusted with abrasive grains as claimed in claim 3, wherein said second metallic pipe or said thin metallic belt are formed of the same metallic material as the metallic material which forms the metallic rod.

5. A wire incrusted with abrasive grains as claimed in claim 3, wherein said metallic rod and said second metallic pipe or said thin metallic belt are formed of a metallic material different from said metallic material which forms the metallic rod.

6. A wire incrusted with abrasive grains as claimed in claim 3, wherein said second metallic pipe or said thin metallic belt are formed of the same metallic material which forms the metallic rod.

7. A wire incrusted with abrasive grains produced by preparing a cylindrical metallic body having a metallic rod inserted into the central part of a metallic pipe with a gap formed between said rod and said pipe, filling said gap with mixed powder comprising metallic powder and abrasive grains having Mohs hardness of 6 or more, shaping said cylindrical metallic body into a wire of desired diameter while first heating said body and then while cooling said body, and removing said outermost metallic pipe.

8. A wire incrusted with abrasive grains as claimed in claim 7, wherein said abrasive grains include at least one material selected from the group consisting of diamond, CBN (cubic boron nitride), ceramics, hard metal, and glass.

9. A wire incrusted with abrasive grains as claimed in claim 7, wherein said metallic rod is tightly covered with a second metallic pipe or has a thin metallic belt wound therearound.

10. A wire incrusted with abrasive grains as claimed in claim 9, wherein said second metallic pipe or said thin metallic belt are formed of the same metallic material which form the metallic rod.

* * * * *